United States Patent
Woods et al.

(10) Patent No.: US 9,339,890 B2
(45) Date of Patent: May 17, 2016

(54) OPTIMIZATION AND CONTROL OF BEAM QUALITY FOR MATERIAL PROCESSING

(75) Inventors: Kenneth J. Woods, Lyme, NH (US); Sanjay Garg, Hanover, NH (US); Tate S. Picard, Enfield, NH (US)

(73) Assignee: Hypertherm, Inc., Hanover, NH (US)

( * ) Notice: Subject to any disclaimer, the term of this patent is extended or adjusted under 35 U.S.C. 154(b) by 728 days.

(21) Appl. No.: 13/324,135

(22) Filed: Dec. 13, 2011

(65) Prior Publication Data
US 2013/0146569 A1    Jun. 13, 2013

(51) Int. Cl.
| | |
|---|---|
| *B23K 26/00* | (2014.01) |
| *B23K 26/06* | (2014.01) |
| *B23K 26/20* | (2014.01) |
| *B23K 26/34* | (2014.01) |
| *B23K 26/36* | (2014.01) |
| *B23K 26/38* | (2014.01) |
| *G02B 6/42* | (2006.01) |

(52) U.S. Cl.
CPC ............. *B23K 26/06* (2013.01); *B23K 26/042* (2015.10); *B23K 26/20* (2013.01); *B23K 26/34* (2013.01); *B23K 26/36* (2013.01); *B23K 26/38* (2013.01); *B23K 26/382* (2015.10); *G02B 6/4206* (2013.01); *G02B 6/4296* (2013.01); *G02B 6/4226* (2013.01)

(58) Field of Classification Search
CPC ...... B23K 26/34; B23K 26/381; B23K 26/38; B23K 26/36; B23K 26/20; B23K 26/06; B23K 26/041; B23K 26/08; B23K 26/3206; G02B 6/4296
USPC ............. 219/121.14, 121.63, 121.64, 121.67, 219/121.61, 121.68, 121.69, 121.71, 219/121.72, 121.73, 121.78
See application file for complete search history.

(56) References Cited

U.S. PATENT DOCUMENTS

| | | | |
|---|---|---|---|
| 4,377,735 A | 3/1983 | Minamida et al. | |
| 4,681,396 A * | 7/1987 | Jones | ............... 385/33 |
| 4,689,467 A | 8/1987 | Inoue | |
| 4,698,480 A | 10/1987 | Klingel | |
| 5,168,610 A | 12/1992 | Ichimura et al. | |
| 5,245,682 A * | 9/1993 | Ortiz, Jr. | .................. G02B 6/32 385/33 |
| 5,272,312 A * | 12/1993 | Jurca | ........................ 219/121.83 |
| 5,350,897 A | 9/1994 | Chun | |

(Continued)

FOREIGN PATENT DOCUMENTS

| | | | |
|---|---|---|---|
| EP | 0 844 042 | 5/1998 | |
| JP | 60240395 A * | 11/1985 | ............. B23K 26/00 |

(Continued)

OTHER PUBLICATIONS

European Search Report for PCT/US2012/068889, Mar. 13, 2013 (12 pages).

(Continued)

*Primary Examiner* — Dana Ross
*Assistant Examiner* — Joseph Iskra
(74) *Attorney, Agent, or Firm* — Proskauer Rose LLP

(57) ABSTRACT

Systems and methods are provided for adjusting a laser beam applied to a workpiece in a processing operation. A laser processing system receives the laser beam that is associated with a beam quality property. The laser processing system adjusts the laser beam to change the beam quality property based on a characteristic of the workpiece, a characteristic of the processing operation, or a combination thereof. The adjusted laser beam can also be delivered to the workpiece.

18 Claims, 6 Drawing Sheets

(56) References Cited

U.S. PATENT DOCUMENTS

| | | | |
|---|---|---|---|
| 5,380,976 | A | 1/1995 | Couch, Jr. et al. |
| 5,446,257 | A * | 8/1995 | Sakamoto et al. ....... 219/121.63 |
| 5,560,843 | A | 10/1996 | Koike et al. |
| 5,566,196 | A * | 10/1996 | Scifres ............................. 372/6 |
| 5,684,642 | A | 11/1997 | Zumoto et al. |
| 5,700,989 | A | 12/1997 | Dykhno et al. |
| 5,815,626 | A | 9/1998 | Kuba et al. |
| 5,866,870 | A | 2/1999 | Walduck |
| 6,163,010 | A | 12/2000 | Kobsa |
| 6,172,323 | B1 | 1/2001 | Ishide et al. |
| 6,229,111 | B1 | 5/2001 | McCay et al. |
| 6,311,099 | B1 * | 10/2001 | Jasper et al. .................. 700/166 |
| 6,326,588 | B1 | 12/2001 | Neubauer et al. |
| 6,388,227 | B1 | 5/2002 | Dykhno et al. |
| 6,705,771 | B2 * | 3/2004 | Jiang et al. ...................... 385/96 |
| 6,947,802 | B2 * | 9/2005 | Picard et al. .................. 700/117 |
| 6,995,335 | B2 | 2/2006 | Wessner |
| 7,186,947 | B2 * | 3/2007 | Connally et al. ......... 219/121.72 |
| 7,348,517 | B2 | 3/2008 | Egawa et al. |
| 7,592,568 | B2 | 9/2009 | Varnham et al. |
| 2002/0148819 | A1 | 10/2002 | Maruyama et al. |
| 2003/0204283 | A1 * | 10/2003 | Picard et al. .................. 700/166 |
| 2004/0188397 | A1 * | 9/2004 | Connally et al. ......... 219/121.67 |
| 2006/0044981 | A1 | 3/2006 | Egawa et al. |
| 2006/0049158 | A1 * | 3/2006 | Schurmann et al. ..... 219/121.83 |
| 2006/0118529 | A1 | 6/2006 | Aoki et al. |
| 2006/0175309 | A1 | 8/2006 | Danzer |
| 2007/0119833 | A1 | 5/2007 | Briand et al. |
| 2007/0119834 | A1 | 5/2007 | Briand et al. |
| 2007/0158319 | A1 * | 7/2007 | Connally et al. ......... 219/121.83 |
| 2007/0195850 | A1 | 8/2007 | Schluter et al. |
| 2007/0278194 | A1 | 12/2007 | Hoelsher et al. |
| 2008/0084905 | A1 | 4/2008 | Doerfel et al. |
| 2009/0039060 | A1 | 2/2009 | Palmquist et al. |
| 2009/0183612 | A1 | 7/2009 | Yamaguchi et al. |
| 2009/0218326 | A1 | 9/2009 | Chouf et al. |
| 2009/0250445 | A1 | 10/2009 | Yamaguchi et al. |
| 2010/0043244 | A1 | 2/2010 | Anderson |
| 2010/0044353 | A1 | 2/2010 | Olsen |
| 2010/0155377 | A1 | 6/2010 | Lindsay et al. |
| 2010/0213178 | A1 | 8/2010 | Lindsay et al. |
| 2010/0314361 | A1 | 12/2010 | Buccella |
| 2011/0248005 | A1 | 10/2011 | Briand et al. |
| 2013/0148925 | A1 | 6/2013 | Muendel et al. |

FOREIGN PATENT DOCUMENTS

| | | |
|---|---|---|
| KR | 20030024149 | 3/2003 |
| KR | 100859206 | 9/2008 |
| WO | 2007/088295 | 9/2007 |
| WO | 2008/084206 | 7/2008 |
| WO | 2009/016645 | 2/2009 |
| WO | 2011/010330 | 1/2011 |

OTHER PUBLICATIONS

Anuar, Azman Bin, "Investigation of Laser Cutting Parameters on Surface Quality of Stainless Steel," Universiti Teknologi, Malaysia, May 2010, 139 pages.

Gregorcic, Peter, "High Power Fiber Lasers," Apr. 7, 2009, University of Ljubljana, Slovenia, 16 pages.

Kratky, et al., "Processing with kW Fibre Lasers - Advantages and Limits," Apr. 21, 2009, XVII International Symposium on Gas Flow, Chemical Lasers, and High-Power Lasers, Austria, 12 pages.

Seefeld, et al., "Cutting and Welding with the New High Brightness Lasers," The Laser User Issue 50, Spring 2008, 6 pages.

Wandera, Catherine, "Performance of High Power Fibre Laser Cutting of Thick-Section Steel and Medium-Section Aluminum," Lappeenranta University of Technology, Finland, Oct. 10, 2010, 146 pages.

Xiao, Zhenhau, "Fiber Laser Cutting of Mild Steel," Lappeenranta University of Technology, Finland, Feb. 12, 2007, 113 pages.

* cited by examiner

OPTIMIZATION AND CONTROL OF BEAM QUALITY FOR MATERIAL PROCESSING

FIELD OF THE INVENTION

The present invention relates generally to material processing using laser beams, and more particularly, to optimizing and controlling laser beam quality for material processing.

BACKGROUND OF THE INVENTION

Lasers are frequently used in material processing applications because laser beams can be focused to small spot sizes, thereby achieving the intensity and power density desired to process industrial-strength materials, such as metals. Exemplary processing applications include cutting, welding, surface modification, drilling and cladding. In a cutting operation, for example, it is generally desirable to focus a delivered laser beam to a small spot size so that a high intensity beam can be applied to the workpiece. This produces narrow kerf widths, high material removal rates and increased processing speed. Therefore, it is generally accepted that the higher the intensity of the applied beam, the faster the processing speed.

However, the relationship between intensity and processing speed breaks down as certain material parameters change, such as when material thickness increases. In cutting operations, for example, thicker materials require a minimum kerf width to ensure effective removal of the melt. This is because as cut speed decreases with increased material thickness, the decreased cut speed causes an increase in residence time in the material. If a laser beam of small spot size is used, this can generate significant evaporation of the material and produces undesirable side effects such as disruption of the metal flow down the kerf, rough and/or gouged cut edges, and even complete loss of penetration. The relationship between spot size and material thickness is more sensitive for oxygen-assisted cutting of mild steel because the exothermic combustion reaction of the steel and oxygen is a critical factor contributing to the cutting process.

SUMMARY OF THE INVENTION

Thus, systems and methods are needed to distribute laser energy more uniformly on a workpiece, regardless of the thickness of the workpiece or the operating parameters used. For example, a laser beam with a desired spot size may be needed to cut material of a certain thickness. Even though the desired spot size requirement can be met by progressively defocusing the laser beam as material thickness increases, or changing some of the hardware, such as the cutting lens, to change the associated focal length, such adjustments typically do not meet both the desired properties for the focal spot size and the beam divergence.

In one aspect, a method is provided for adjusting a laser beam applied to a workpiece in a processing operation. The method includes providing the laser beam to a laser processing system. The laser beam is associated with a beam quality property. The method also includes adjusting, by the laser processing system, the laser beam to change the beam quality property based on a characteristic of the workpiece, a characteristic of the processing operation, or a combination thereof. The method further includes delivering the laser beam from the laser processing system to the workpiece.

In another aspect, a laser processing system is provided for adjusting a laser beam applied to a workpiece in a processing operation. The system includes a laser generator for generating the laser beam and the laser beam is associated with a beam quality property. The system also includes an adjustment module for adjusting the laser beam to change the beam quality property based on a characteristic of the workpiece, a characteristic of the processing operation, or a combination thereof. The system further includes a delivery mechanism for delivering the laser beam to the workpiece.

In yet another aspect, the invention features a device for adjusting a laser beam provided to a delivery mechanism for application to a workpiece in a processing operation. The device includes an input for receiving the laser beam. The device also includes an adjustment module for modifying a propagation characteristic of the laser beam from the input based on a characteristic of the workpiece, a characteristic of the operation, or a combination thereof. The device further includes an output for providing the laser beam to the delivery mechanism. In some embodiments, the device further includes a single-clad optical fiber for delivering the laser beam to the output or to the workpiece.

In other examples, any of the aspects above can include one or more of the following features. The beam quality property of the laser beam can be an $M^2$ value and/or a beam parameter product (BPP) value. The BPP value is defined as the product of the focal spot radius of a laser beam and the laser beam's divergence half-angle. The $M^2$ value is defined as the ratio of the BPP value of a given beam to the BPP value of a perfect beam with the same wavelength. The laser beam can be generated by a laser generator, which can be a fiber-delivered laser source.

In some embodiments, adjusting the laser beam includes degrading the beam quality property when the thickness of the workpiece increases. Degrading the beam quality property can include changing an $M^2$ value of the laser beam, a BPP value of the laser beam, or a combination thereof.

In some embodiments, adjusting the laser beam includes enhancing the beam quality property when the thickness of the workpiece decreases. Enhancing the beam quality property can include changing an $M^2$ value of the laser beam, a BPP value of the laser beam, or a combination thereof. As an example, the laser beam quality can be enhanced if the laser beam is comprised of a coherent high order mode or a superposition of high order modes.

The laser beam property can be adjusted based on a characteristic of the workpiece, a characteristic of the processing operation, or a combination thereof. In some embodiments, the characteristic of the workpiece includes a thickness of the workpiece or a material type of the workpiece. In some embodiments, the characteristic of the processing operation includes a type of the processing operation, such as a cutting operation, a welding operation, a drilling operation, a marking operation, or a cladding operation. In some embodiments, adjusting the laser beam to change the beam quality property is further based on a characteristic of a processing gas used in the processing operation.

In some embodiments, the laser processing system includes a single-clad optical fiber for delivering the laser beam. In some embodiments, the laser processing system can adjust the beam property of the laser beam by altering one or more conditions for launching the laser beam into the optical fiber.

In some embodiments, adjusting the laser beam includes displacing the laser beam from a center of an input end of the optical fiber by an amount determined based on the characteristic of the workpiece, the characteristic of the processing operation, or a combination thereof. The laser beam is then provided to the input end of the optical fiber.

In some embodiments, adjusting the laser beam includes aligning the laser beam with a center of an input end of the optical fiber and changing an angle of the laser beam relative to a longitudinal axis of the optical fiber by an amount based on the characteristic of the workpiece, the characteristic of the processing operation, or a combination thereof. The laser beam is then provided to the input end of the optical fiber.

In some embodiments, adjusting the laser beam includes displacing the laser beam from a center of an input end of the optical fiber by a first amount, changing an angle of the laser beam relative to a longitudinal axis of the optical fiber by a second amount, and providing the laser beam to the input end of the optical fiber. At least one of the first amount or the second amount is determined based on the characteristic of the workpiece, the characteristic of the processing operation, or a combination thereof.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION OF THE INVENTION

Figure 1:
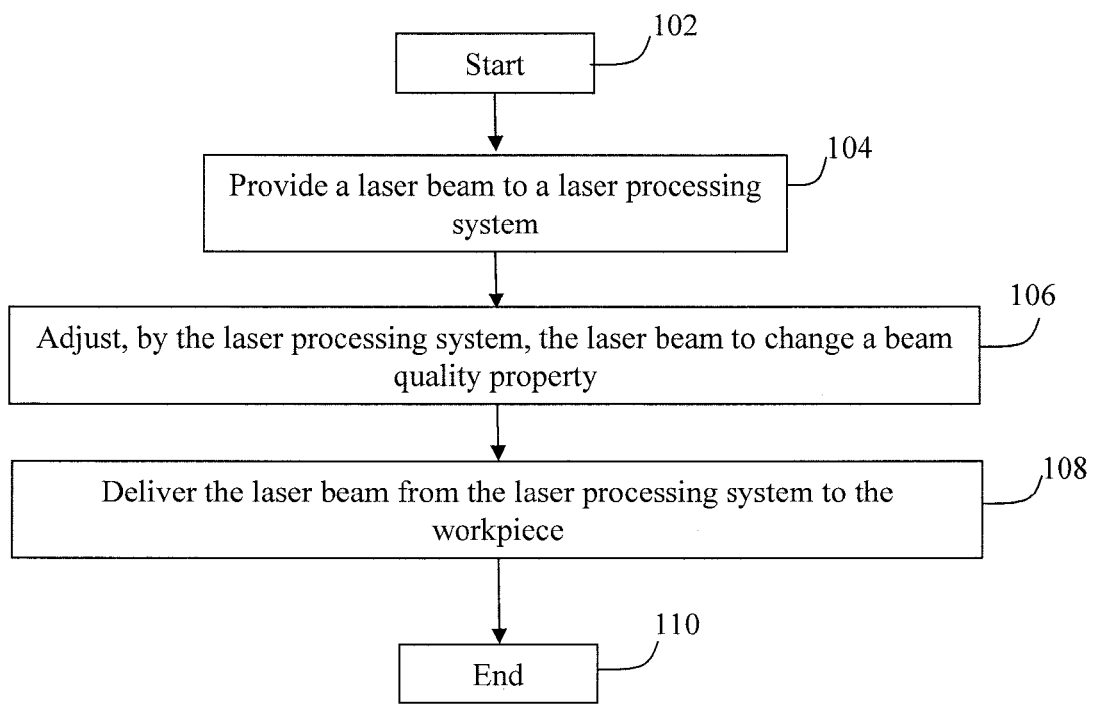
FIG. 1 shows an exemplary process for adjusting a laser beam applied to a workpiece in a material processing operation.

FIG. 1 shows an exemplary process for adjusting a laser beam applied to a workpiece in a material processing operation. The process starts (step 102) when a laser beam is delivered to a laser processing system from a laser source (step 104). The laser beam is associated with a beam quality property. The laser processing system can adjust the laser beam to change the beam quality property (106). In some embodiments, the beam quality property can be adjusted based on a characteristic of the workpiece (e.g., a thickness of the workpiece), a characteristic of the processing operation, or a combination thereof (step 106). The process ends (step 110) when, after the laser processing system makes the appropriate adjustments to the laser beam, the laser beam is delivered to the workpiece to produce a more desired laser energy distribution on the workpiece, such as along the kerf of a cut (step 108).

The beam quality defines how tightly a laser beam can be focused for a fixed beam diameter and focal length. The beam quality can be quantified by a beam quality property. In some embodiments, the beam quality property is the beam parameter product (BPP) value, which is defined as the product of the focal spot radius of a laser and the laser's divergence half-angle. The best possible beam quality is represented by a BPP value equal to the ratio of laser beam wavelength ($\lambda$) and the constant pi ($\pi$). This means that for a fixed optical arrangement, the smallest spot size achievable is by a Gaussian beam. For a real beam, however, the spot size is larger, which means that the corresponding BPP value is higher and the beam quality is degraded in comparison to the ideal beam quality. Furthermore, the higher the BPP value, the more degraded the laser beam. In some embodiments, the beam quality property is the $M^2$ value, which is defined as the ratio of the BPP value of a given beam to the BPP value of a perfect beam with the same wavelength. Therefore, similar to the BPP value, the $M^2$ value of a theoretically perfect beam is 1 and that of a real beam is greater than 1. Another measure of the beam quality is the K factor, which is the inverse of the $M^2$ value (i.e., $k=1/M^2$). Therefore, the more degraded the laser beam, the lower the K factor.

Using the initial beam quality property as a reference, the laser processing system can adjust the laser beam to change the property value up or down based on a characteristic of the workpiece (e.g., a thickness of the workpiece), a characteristic of the processing operation, or a combination thereof. For example, the inventors have discovered that for processing a relatively thick material, such as cutting mild steel, it is advantageous to degrade the beam quality of the laser applied to the material, thereby increasing the beam quality property value, such as increasing the BPP or the $M^2$ value. This increases the spot size and/or divergence of the laser beam and generates a more uniform energy distribution within the beam that can be transferred to the workpiece, such as along the kerf of a cut during a cut application. In some embodiments, if the beam quality property is the K factor, it is desirable to decrease the beam quality property value in order to degrade the laser beam. This discovery is contrary to the established practice in the laser industry, where considerable effort has been devoted to improving the beam quality of lasers by lowering the BPP or $M^2$ value or raising the K factor to be as close as possible to that of the perfect beam, regardless of the thickness of the material or operating characteristics.

In some embodiments, the laser beam quality can be adjusted to optimize the beam quality of the laser delivered to a workpiece based on the material properties of the workpiece or the processing operation. In some embodiments, the laser processing system adjusts the beam quality property based on a correlation between the thickness of the workpiece and a desired property value. In general, the thicker the material, the higher the desired BPP or $M^2$ value. This value, however, can be bounded above by the delivery mechanism, such as the numerical aperture or diameter of an optical fiber used to deliver the beams. Conversely, a thinner material can be processed faster with a beam with a lower BPP or $M^2$ value. This value, however, is bounded below by laws of physics for the perfect Gaussian beam as well as the best possible beam quality from the laser source.

In some embodiments, the laser processing system correlates the size of a feature being processed with the desired BPP or $M^2$ value. In general, a larger feature correlates to a larger BPP or $M^2$ value. In addition, a small feature may require a smaller kerf to obtain the desired resolution. Therefore, the BPP or $M^2$ value may be small for the small feature.

In some embodiments, the correlations can take into account of the material type of the workpiece. For example, the optimal delivered beam properties can be different for cutting materials of the same thickness (e.g., 6 mmm) but different material types, such as mild steel versus stainless steel. In some embodiments, the correlations can take into account of the type of processing operation, such as a cutting operation, a welding operation, a drilling operation, a marking operation, or a cladding operation. For example, in a welding operation, the optimal beam properties can depend on the fit of the joint between two workpieces to be joined.

Figure 2:
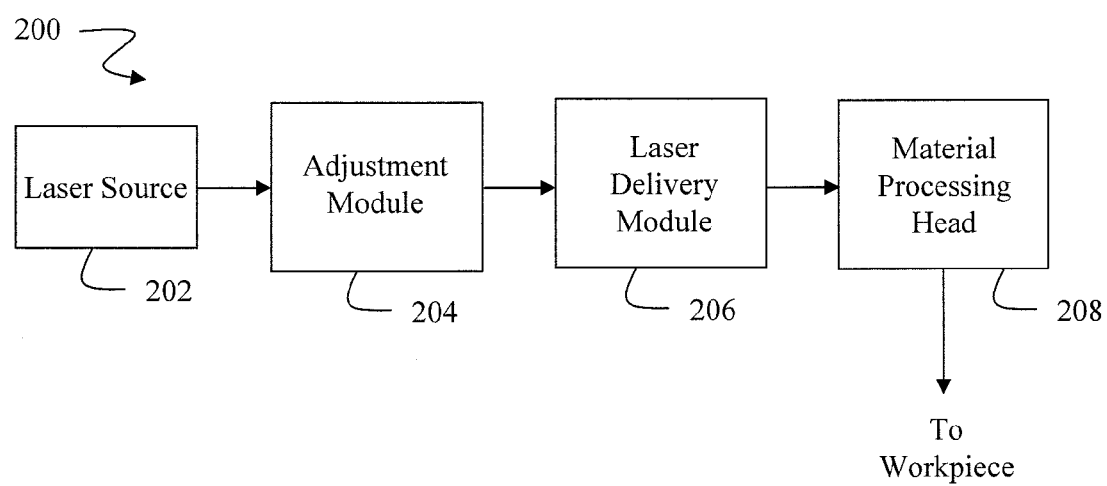
FIG. 2 shows an exemplary laser processing system of the present invention.

Furthermore, if the same laser processing system is used for multiple operations such as cutting and welding, cutting typically requires a higher beam quality while welding produces optimal results with a lower beam quality. In some embodiments, the correlations can take into account of the type of processing gas used. For example, when cutting mild steel, the optimal beam properties depend on the use of an inert or reactive gas FIG. 2 shows an exemplary laser processing system of the present invention. Conventional laser processing systems either are not effective in changing the beam quality, i.e., the BPP or $M^2$ value, or do not allow optimization of the beam quality based on material and operational parameters. For example, in the context of $CO_2$ lasers, many systems employ deformable mirrors to control beam divergence and focal position. These systems often interchange several focal length lenses to allow optimal cutting parameters for a range of material thicknesses. However, simply changing the beam diameter and focal length of a system does not change the beam quality of the laser beam. Other laser systems change the BPP or $M^2$ value by using a double-clad fiber, such as by launching a beam into a smaller core for higher beam quality applications and into a larger core for lower beam quality applications. However, this design limits the laser to two discrete beam quality values and requires expensive fiber geometries to implement. In addition, such a fiber delivery mechanism does not allow optimization based on thickness of the workpiece or other parameters.

As shown in FIG. 2, an exemplary laser processing system 200 of the present invention includes a laser source 202, an adjustment module 204, a laser delivery module 206 and a material processing head 208. The laser source 202 can be any laser used for material processing, such as a fiber laser, disc laser, Nd:YAG laser, diode laser $CO_2$ laser, or eximer laser. If the laser source 202 is a fiber laser source, it can include an optical fiber with a rare-earth-doped core for generating the laser beam. The fiber can be doped with erbium or ytterbium, for example. In some embodiments, an optical collimator (not shown) is inserted between the laser source 202 and the adjustment module 204 to limit the divergence of the beam and make rays of the beam more parallel.

After the laser source 202 generates a laser beam, the quality of the beam can be changed by the adjustment module 204 before the laser delivery module 206 delivers the beam to the material processing head 208 for application to a workpiece. In some embodiments, the laser delivery module 206 can include an optical fiber made of fused silica. The optical fiber can be a single-clad fiber.

To adjust the beam quality, the adjustment module 204 can change the manner with which the laser beam is launched into the input end of the optical fiber in the laser delivery module 206. In general, the beam quality is a function of the core diameter of the optical fiber and the maximum angle at which the laser exits the optical fiber. The core diameter is the diameter of the cylindrical core region of the fiber where guided light waves are confined. The exit angle is less than or equal to the optical fiber's numerical aperture (NA), which is the sine of the largest angle with respect to the fiber axis that the laser can propagate inside of the fiber while remaining guided within the core. Hence, the beam quality of a laser beam exiting the optical fiber can be adjusted by changing the core diameter, the propagation angle of the laser beam in the optical fiber, or a combination thereof.

In addition, it has been observed that beams launched at lower angles and/or lower order modes at the input end of the optical fiber tend to preserve the corresponding angles or modes at the exit end of the fiber and therefore have a delivered beam quality less than the maximum permitted in the fiber. In contrast, beams of higher launch angles and/or higher order modes tend to propagate at higher angles and/or modes and produce higher BPP or $M^2$ values for the delivered beams. Therefore, to change the beam quality of a laser beam, the adjustment module 204 can selectively excite low or high order modes in the beam or launch at low or high angles, thereby changing the laser beam as it travels through the optical fiber and consequently changing the BPP or $M^2$ value of the delivered laser beams.

Figure 3A:
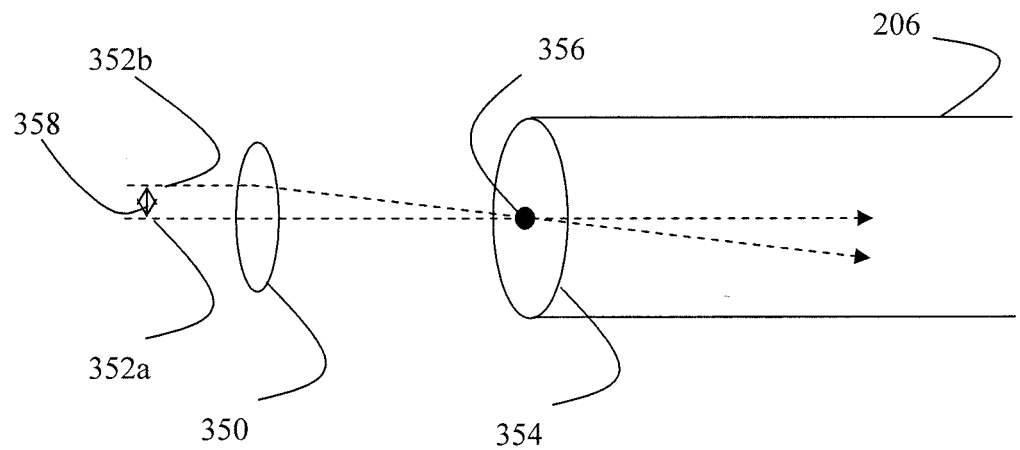
FIGS. 3A-C show exemplary approaches used by an adjustment module to change the beam quality of a laser beam.
Figure 3B:
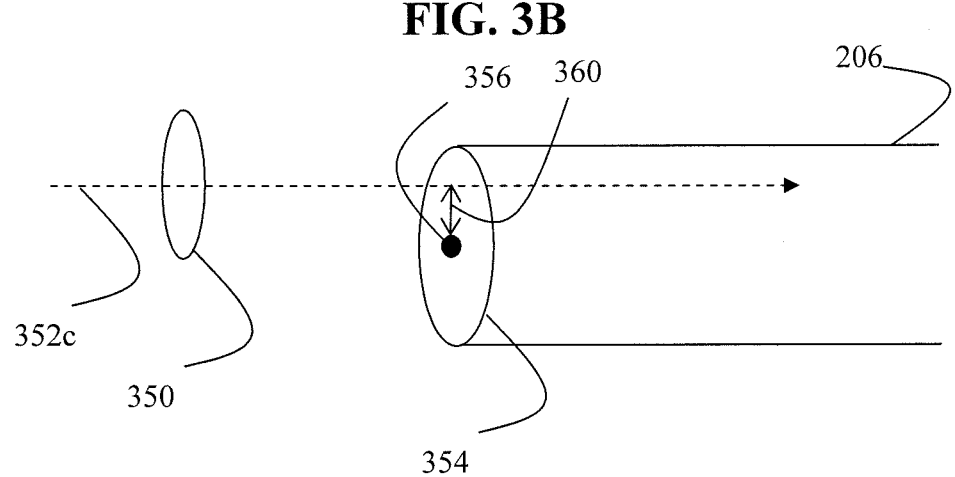
Figure 3C:
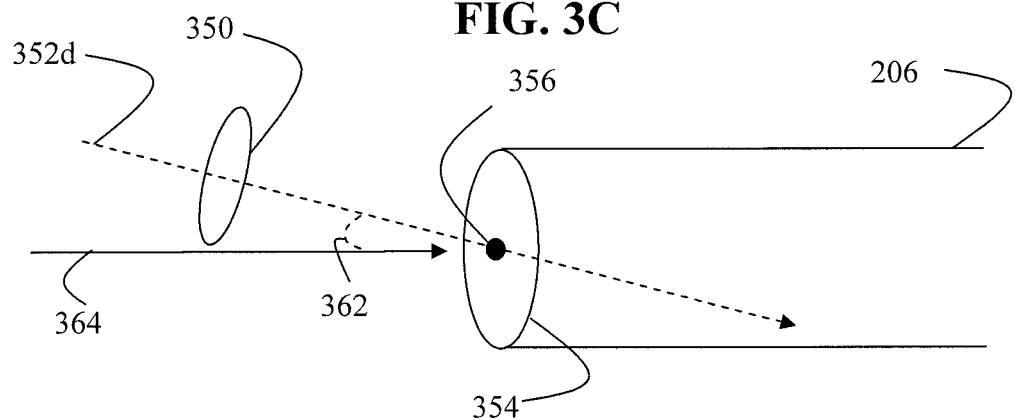

FIGS. 3A-C show exemplary approaches used by the adjustment module 204 to change the beam quality of a laser beam. Usually a lens 350 is used to launch a laser beam into the input end 354 of the optical fiber in the delivery module 206. The lens' optical axis (not shown) can pass through the center of the lens 350 and coincide with the axis of rotational symmetry. In some embodiments as illustrated in FIG. 3A, to excite low order modes of the laser beam, the adjustment module 204 launches the beam 352a along the optical axis of the lens 350 into the input end 354 of the optical fiber as close to the center 356 of the optical fiber as possible and at the lowest possible input angle so as to preserve beam quality and generate low BPP or $M^2$ value. In contrast, to excite high order modes of the laser beam, the adjustment module 204 translates the beam 352b with respect to the optical axis of the lens 350 and launches the translated beam 352b into the lens 350 in a path parallel to the optical axis. The lens 350 focuses the off-axis beam 352b and changes the angle of propagation of the beam 352b as it travels toward the center 356 of the input end 354 of the optical fiber. This increases the angle at which the laser is launched into the optical fiber, which degrades the beam quality and increases the BPP or $M^2$ value. The amount of translation 358 from the optical axis of the lens 350 can be determined as a function of the thickness of the material being processed, the material type of the workpiece, the type of processing operation selected, the type of processing gas used, or a combination thereof.

In some embodiments, as shown in FIG. 3B, to excite high order modes in the beam received from the laser source 202, the adjustment module 204 keeps the beam 352c centered on the launch lens 350 along the optical axis, but translates the input end 354 of the optical fiber such that the intersection of the beam 352c and the input end 354 of the optical fiber is away from the center 356 of the input end of the optical fiber. The amount of displacement 360 can be a function of the thickness of the material being processed, the material type of the workpiece, the type of processing operation selected, the type of processing gas used, or a combination thereof.

In some embodiments, as shown in FIG. 3C, to excite high order modes in the beam received from the laser source 202, the adjustment module 204 changes the angle of rotation 362 of the lens 350 with respect to the longitudinal axis 364 of the optical fiber. The adjustment module 204 then launches the laser beam 352d along the optical axis of the lens 350 into the center 356 of the input end 354 of the optical fiber. As a result, the incident angle of the beam 352d at the input end 354 is increased. The angle of rotation 362 of the lens 350 can be determined as a function of the thickness of the material being processed, the material type of the workpiece, the type of processing operation selected, the type of processing gas used, or a combination thereof.

In some embodiments, to excite high order modes in the beam received from the laser source 202, the adjustment module 204 rotates the fiber end about the focal spot, zoom control the launch optics, and/or employ other techniques to change the propagation angle of the beam through the optical fiber. In some embodiments, the adjustment module 204 uses a combination of the aforementioned techniques, such as launching the beam into the input end of the optical fiber at angle, as shown in FIG. 3C, while displacing the laser beam from the center of the input end of the optical fiber, as shown in FIG. 3A or 3B. The angle with which the adjustment module 204 launches the beam into the input end of the optical fiber and the amount of displacement from the fiber center can be a function of the thickness of the material being processed, the material type of the workpiece, the type of processing operation selected, the type of processing gas used, or a combination thereof.

In general, being able to change one or more processing parameters of a laser beam is advantageous for various processing applications including cutting, welding, cladding and marking. For example, in a welding operation, the adjustment module 204 can control the depth of focus of a beam from the laser source 202 such that a selected depth of focus is matched to a specific material thickness. This is possible because the depth of focus is closely related to the beam quality or BPP value. Using the same principles, the adjustment module 204 can control the depth of focus of a beam from the laser source 202 such that a selected depth of focus is matched to specific width and depth of material being deposited for cladding and three-dimensional laser forming. Moreover, in marking applications, the adjustment module 204 can control beam brightness to compensate for marking materials with varying reflectivity. This is possible because the minimum achievable spot size varies with beam quality.

Figure 4:
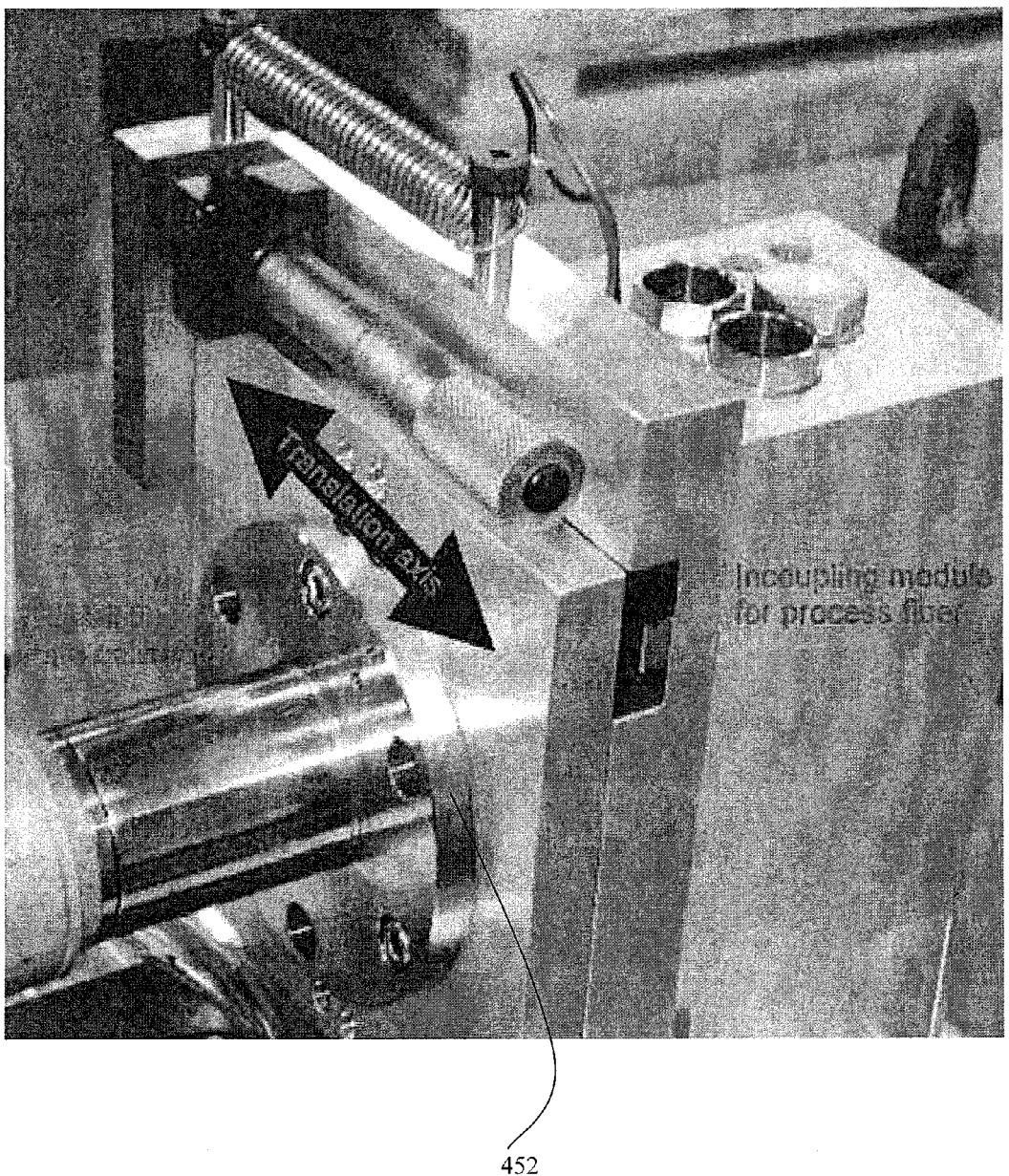
FIG. 4 shows another exemplary laser processing system of the present invention.

FIG. 4 shows another exemplary laser processing system of the present invention. The laser processing system includes an adjuster 452 having a translation mechanism for displacing, by a measurable amount, a laser beam relative to the center of an optical fiber in the laser delivery module 206. The optical fiber can be a 100-micron core fiber. In some embodiments, the adjuster 452 also includes an f50 mm in-coupling unit for providing fiber alignment and for measuring any scatter signal to ensure that the laser beam from the laser source 202 is properly launched into the input end of the optical fiber. The laser beam can be generated by a laser source 202 having a 50-micron core fiber. The laser beam can be conditioned by an f50 mm collimator before being supplied to the adjuster 452.

In operation, the translation mechanism of the adjuster 452 displaces the input beam by a measurable amount using, for example, the approach illustrated in FIG. 3A. The diameter of the input beam may be about 6 mm. In certain experiments, the translation performed on the beam is 3 mm or 4.5 mm from the center of the input end of the f50 mm in-coupling unit. In general, the amount of translation is determined based on a characteristic of the workpiece (e.g., the material thickness of the workpiece), a characteristic of the processing operation, or a combination thereof. Each translation can result in a higher input angle for launching the beam into the optical fiber, thereby increasing the output divergence of the beam from the optical fiber, which increases the BPP or $M^2$ value of the beam. The translated launch can also excite high order modes of the beam in the optical fiber, which produces additional advantageous properties such as changing the intensity distribution of the beam near the focus.

Figure 5A:
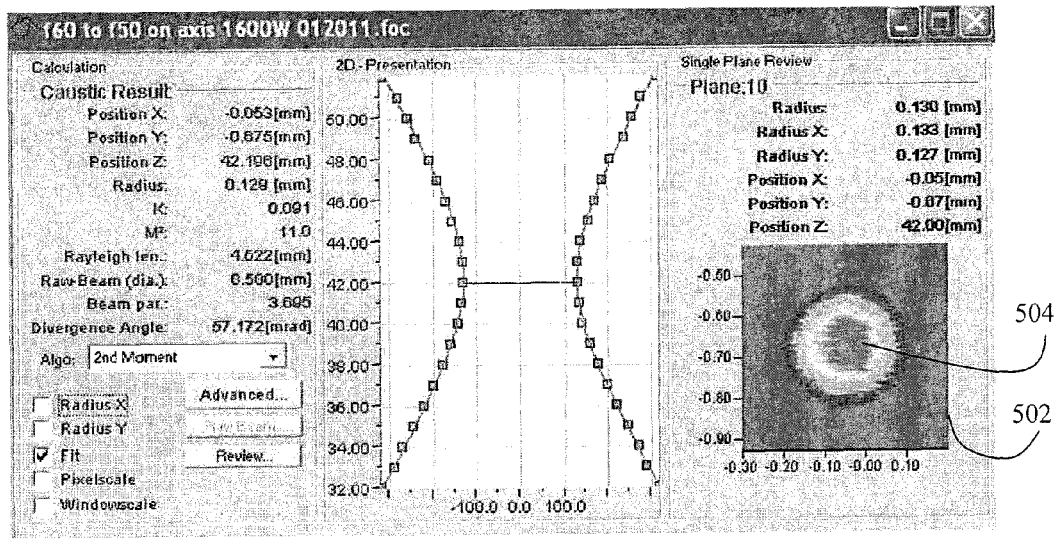
FIGS. 5A-C show exemplary beam quality measurements obtained using the laser processing system of FIG. 4.
Figure 5B:
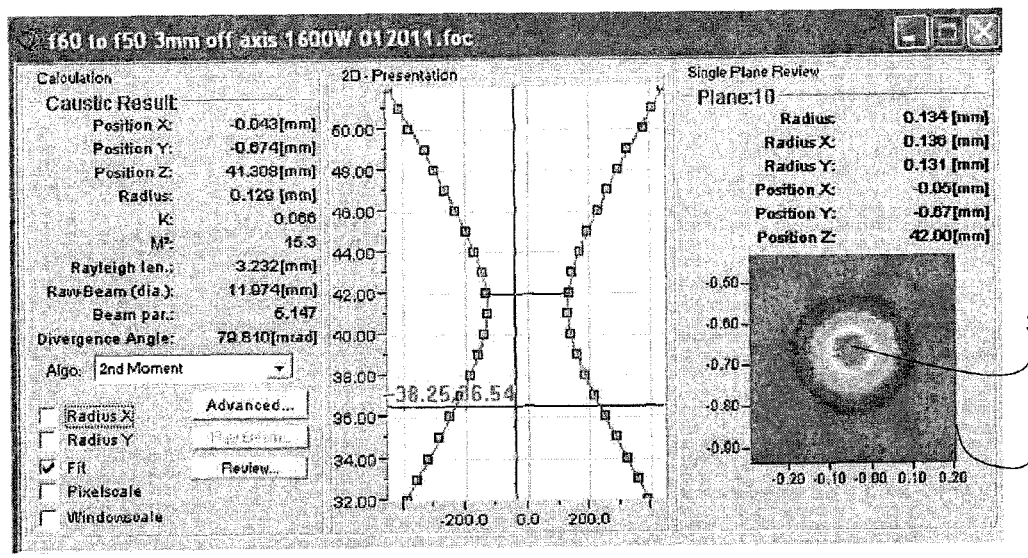
Figure 5C:
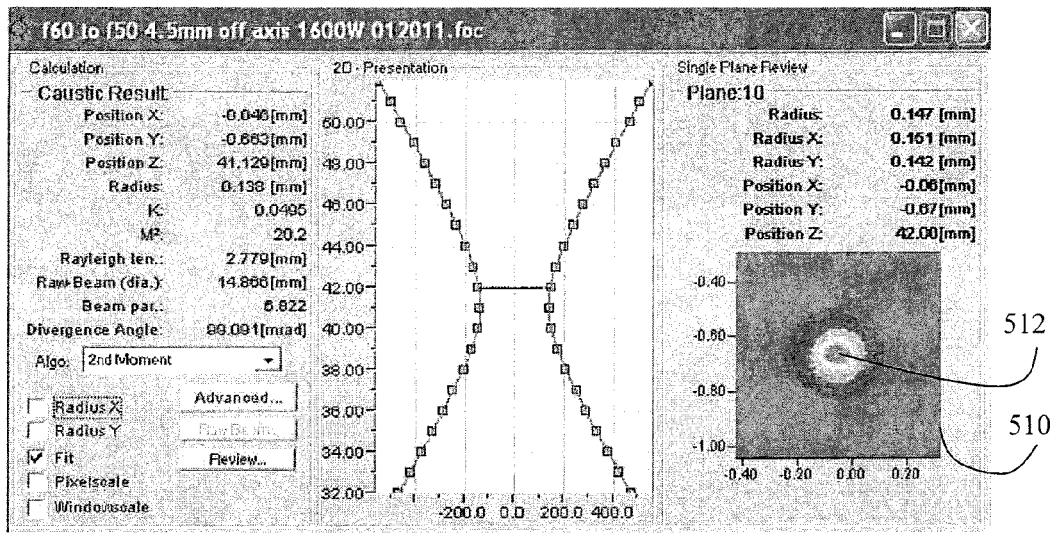

FIGS. 5A-C show exemplary beam quality measurements obtained using the laser processing system of FIG. 4. Specifically, for the results of FIG. 4A, the laser beam was launched into the center of the input end of the optical fiber along its longitudinal axis. Hence, no off-axis translation was performed by the adjuster 452 to obtain the results of FIG. 4A. As shown, the corresponding $M^2$ value is about 11.0 and the corresponding divergence angle of the beam exiting the optical fiber is about 57.2 mrad with a focal spot size of about 0.129 mm.

FIG. 5B shows another set of beam quality measurements using the laser processing system of FIG. 4. For the results of FIG. 5B, the laser beam was translated about 3 mm from the center of the input end of the in-coupling unit as the beam was launched into the fiber. As shown, the corresponding $M^2$ value is about 15.3 and the corresponding divergence angle is about 79.8 mrad with a focal spot size of about 0.129 mm. The higher $M^2$ value in comparison to the $M^2$ value of FIG. 5A indicates that the laser beam has been degraded due to the 3 mm translation.

FIG. 5C shows yet another set of beam quality measurements using the laser processing system of FIG. 4. For the results of FIG. 5C, the laser beam was translated about 4.5 mm from the center of the input end of the in-coupling unit as the beam was launched into the fiber. As shown, the corresponding $M^2$ value is about 20.2 and the corresponding divergence angle is about 99.1 mrad with a focal spot size of about 0.138 mm. The even higher $M^2$ value in comparison to the $M^2$ value of FIG. 5B indicates that beam quality becomes more degraded as the amount of off-center beam translation gets larger.

In addition, it has been observed that the intensity distribution at the focus also varies as the beam quality is changed. The intensity distributions 502, 506 and 510 in FIGS. 5A-C, respectively, illustrate that as the beam quality decreases, the central peak in intensity 504, 508 or 512 decreases in radius, thus power becomes less concentrated in the center of the beam.

Figure 6:
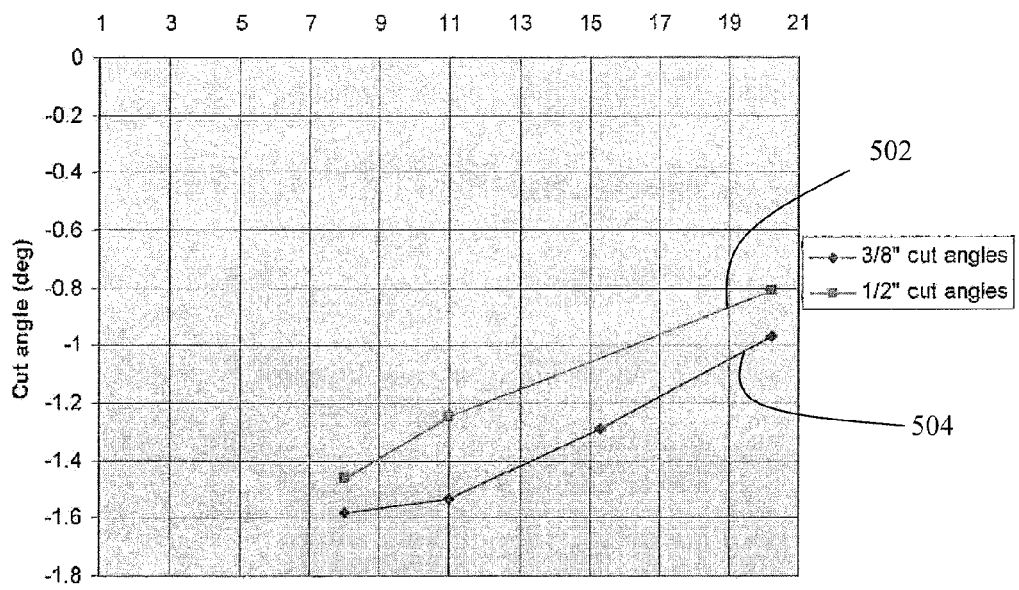
FIG. 6 shows cut quality measurements obtained using the laser processing system of FIG. 4.

FIG. 6 shows cut quality measurements obtained using the laser processing system of FIG. 4. Specifically, cutting trials were conducted on two pieces of mild steel with oxygen assist, one is ⅜-in thick and the other is ½-in thick. Curve 502 is a plot of $M^2$ value versus cut angle for the ½-in steel and curve 504 is a plot of $M^2$ value versus cut angle for the ⅜-in steel. Both of the curves 502 and 504 indicate that as beam quality degrades, which is reflected by the increasing $M^2$ value, the cut quality improves, as indicated by the increasingly perpendicular cut angle. To produce the samples, the laser processing system used identical process parameters except for the amount of displacement of the laser beam from the center of the input end of the in-coupling unit, which ranged from about 3 mm to about 4.5 mm.

Although various aspects of the disclosed method have been shown and described, modifications may occur to those skilled in the art upon reading the specification. The present application includes such modifications and is limited only by the scope of the claims.

What is claimed is:

1. A method for adjusting a laser beam applied to a workpiece in a processing operation, the method comprising:
   providing the laser beam to a laser processing system comprising an optical fiber, the laser beam being associated with a beam quality property;
   adjusting, by the laser processing system, the laser beam prior to the laser beam entering an input end of the optical fiber to change the beam quality property of the laser beam exiting from an output end of the optical fiber,
   wherein the adjusting of the laser beam at the input end of the optical fiber comprises at least one of displacing the laser beam from a center of the input end of the optical fiber by a first amount, or changing an angle of the laser beam relative to a longitudinal axis of the optical fiber by a second amount, wherein at least one of the first amount or the second amount is based on at least one of (i) a thickness of the workpiece, or (ii) a material type of the workpiece; and delivering the laser beam from the laser processing system to the workpiece.

2. The method of claim 1 wherein the beam quality property comprises an $M^2$ value.

3. The method of claim 1 wherein the beam quality property comprises a beam parameter product (BPP) value.

4. The method of claim 1 wherein adjusting the laser beam comprises degrading the beam quality property when the thickness of the workpiece increases.

5. The method of claim 4 wherein degrading the beam quality property comprises increasing an $M^2$ value of the laser beam, a BPP value of the laser beam, or a combination thereof.

6. The method of claim 1 wherein adjusting the laser beam comprises enhancing the beam quality property when the thickness of the workpiece decreases.

7. The method of claim 6 wherein enhancing the beam quality property comprises decreasing an $M^2$ value of the laser beam, a BPP value of the laser beam, or a combination thereof.

8. The method of claim 1 further comprising adjusting the laser beam to change the beam quality property based on a characteristic of a processing gas used in the processing operation.

9. The method of claim 1 further comprising providing the laser beam from a laser generator, wherein the laser generator comprises a fiber-delivered laser source.

10. The method of claim 1 wherein the optical fiber comprises a single-clad optical fiber for delivering the laser beam to the workpiece.

11. A method for adjusting a laser beam applied to a workpiece in a processing operation, the method comprising:

providing the laser beam to a laser processing system comprising an optical fiber, the laser beam being associated with a beam quality property;

adjusting, by the laser processing system, the laser beam prior to the laser beam entering an input end of the optical fiber to change the beam quality property of the laser beam exiting from an output end of the optical fiber, wherein the adjusting of the laser beam at the input end of the optical fiber comprises at least one of displacing the laser beam from a center of the input end of the optical fiber by a first amount, or changing an angle of the laser beam relative to a longitudinal axis of the optical fiber by a second amount, wherein at least one of the first amount or the second amount is based on a thickness of the workpiece; and delivering the laser beam from the laser processing system to the workpiece.

12. The method of claim 11, further comprising adjusting at least one of the first amount or the second amount to degrade the beam quality property when the thickness of the workpiece increases.

13. The method of claim 12, wherein degrading the beam quality property comprises changing an $M^2$ value of the laser beam, a BPP value of the laser beam, or a combination thereof.

14. A method for adjusting a laser beam applied to a workpiece in a processing operation, the method comprising:

providing the laser beam to a laser processing system comprising an optical fiber, the laser beam being associated with a beam quality property;

adjusting, by the laser processing system, the laser beam prior to the laser beam entering an input end of the optical fiber to change the beam quality property of the laser beam exiting from an output end of the optical fiber, wherein the adjusting of the laser beam at the input end of the optical fiber comprises at least one of displacing the laser beam from a center of the input end of the optical fiber by a first amount, or changing an angle of the laser beam relative to a longitudinal axis of the optical fiber by a second amount, wherein at least one of the first amount or the second amount is adjusted to provide a higher beam quality property for a cutting operation in comparison to a welding operation; and delivering the laser beam from the laser processing system to the workpiece.

15. A method for adjusting a laser beam applied to a workpiece in a processing operation, the method comprising:

providing the laser beam to a laser processing system comprising an optical fiber, the laser beam being associated with a beam quality property;

adjusting, by the laser processing system, the laser beam prior to the laser beam entering an input end of the optical fiber to change the beam quality property of the laser beam exiting from an output end of the optical fiber, wherein the adjusting of the laser beam at the input end of the optical fiber comprises at least one of displacing the laser beam from a center of the input end of the optical fiber by a first amount, or changing an angle of the laser beam relative to a longitudinal axis of the optical fiber by a second amount, wherein at least one of the first amount or the second amount is based on a characteristic of a processing gas used in the processing operation; and delivering the laser beam from the laser processing system to the workpiece.

16. The method of claim 15, wherein the characteristic of the processing gas is inert or reactive.

17. A method for adjusting a laser beam applied to a workpiece in a processing operation, the method comprising:

providing the laser beam to a laser processing system comprising an optical fiber, the laser beam being associated with a beam quality property;

adjusting, by the laser processing system, the laser beam prior to the laser beam entering an input end of the optical fiber to change the beam quality property of the laser beam exiting from an output end of the optical fiber, wherein the adjusting of the laser beam at the input end of the optical fiber comprises changing an angle of propagation at which the laser beam is launched into the center of the input end of the optical fiber by an amount based on a thickness of the workpiece; and delivering the laser beam from the laser processing system to the workpiece.

18. The method of claim 17, wherein changing the angle of propagation comprises (a) translating the laser beam from an optical axis of a lens positioned at the input end of the optical fiber and (b) launching the translated beam into the lens in a path parallel to the optical axis of the lens to focus the translated beam to the center of the input end of the optical fiber.

* * * * *